Nov. 16, 1954 N. V. DANIEL 2,694,262
GAUGE FOR THREAD CUTTING TOOLS
Filed Aug. 5, 1952
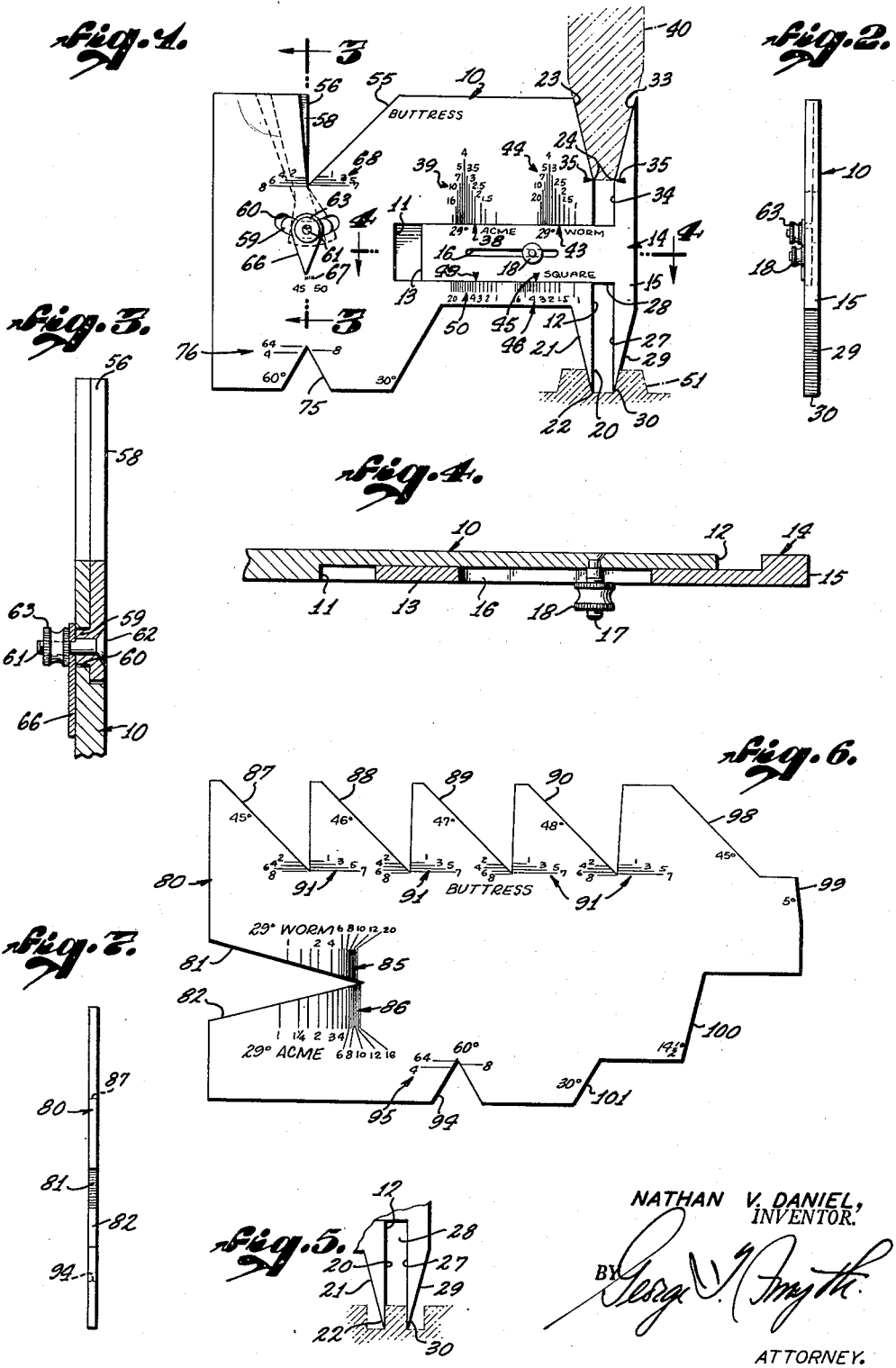
NATHAN V. DANIEL,
INVENTOR.
BY George V. Smyth
ATTORNEY.

United States Patent Office 2,694,262
Patented Nov. 16, 1954

2,694,262

GAUGE FOR THREAD CUTTING TOOLS

Nathan V. Daniel, Lawndale, Calif.

Application August 5, 1952, Serial No. 302,795

2 Claims. (Cl. 33—201)

This invention relates to gages, with special reference to devices for gaging thread cutting tools, and is directed to a simple, compact gage device having multiple functions to afford a wide range of usefulness in the art of cutting screw threads and worm gear threads.

Accurate cutting of threads as required for standardization and interchangeability of screw threaded parts depends, in the first place, on exceptionally close accuracy in the grinding of thread-cutting tools and, in the second place, on close accuracy in positioning a thread cutting tool relative to a work piece in which threads are to be cut. The present invention provides close accuracy in both of these respects for the purpose of cutting various threads including 29° Acme screw threads, square screw threads, buttress screw threads, and both 29° threads and square threads for worm gears.

With reference to 29° Acme threads and 29° worm gear threads, the invention is characterized by the use of a single index line or reference mark for guidance in grinding thread-cutting tools corresponding to thread sizes for a wide range in pitch or threads per inch. It is well known that an accurate 29° V-notch in the edge of a gage plate will afford accurate guidance in grinding the side edges of a cutting tool for 29° threads and that a reference mark or pitch index line on the edges of the index may be used to gage the width of the nose of the tool to cut a thread at a given pitch. When the side edges of the cutting tool accurately contact the corresponding converging side edges of the V-shaped gage notch and the nose of the tool then registers with the transverse guide line or pitch index on the margin of the notch, the tool is accurately ground for cutting a screw thread at the pitch represented by the index.

A feature of the present invention is improvement relative to such a pitch index at the side of a V-notch for guidance with respect to the nose of the thread cutting tool. This improvement consists in providing a sharp change in direction of the notch edge to form a point or apex to serve as the pitch index. Thus, visual reference in the gaging operation is provided by two apex points at the sides of the notch instead of, or in addition to, the usual index mark. It has been found that the convergence of the side portions of the notch to an apex on each side of the notch increases accuracy in gaging a thread-cutting tool because, in the first place, the apex on each side of the notch is more prominent than a corresponding scribed line, especially when the gage is soiled, and, in the second place, because the eye tends to follow the converging lines to the apex and the tool is properly ground when the converging lines lead to the nose or front edge of the tool.

With reference to compactness, convenience, and simplicity of procedure, the invention is further characterized by the provision of a single notch of the character described with a single reference apex point on each side of the notch for gaging tools over a whole pitch range. This multiple function on the part of a single notch is provided by using two separate pieces of metal for the two sides of the notch with the two pieces of metal relatively movable to vary the width of the notch without change in the angle of convergence of the notch sides. Such use of a single variable-width notch with a single pair of reference apexes for multiple pitch gaging is made possible by providing a pitch scale or series of pitch indexes remote from the variable notch itself. The remoteness precludes confusion between the index at the notch that is used for all nose widths and the necessary numerous pitch marks for guidance in adjusting the width of the notch.

The preferred forms of the invention are characterized by the use of a main gage plate or member in combination with a relatively movable second or auxiliary gage plate or member to form a variable gage notch. To provide such a variable notch with an index apex on each side, I prefer to use a first or main gage plate with a longitudinal channel therein opening on one end thereof together with a second gage plate having a shank portion slidingly mounted in this longitudinal channel. The second gage plate has a head portion which lies beyond the end of the main gage plate and defines therewith the desired variable notch with an index apex on each side of the notch. The shank of the second gage member slides in the longitudinal channel to widen or narrow the gage notch and a series of index marks for pitch values are provided on the shank and on the adjacent portion of the main gage member.

A further feature of this form of the invention is that the movable head of the second gage member may form with the main gage member more than one variable notch for gaging thread cutting tools. In the preferred form of the invention, the head of the second gage member extends in one direction from its shank to form a 29° variable gage notch with the adjacent edge of the main gage member and the head also extends in the other direction to form a variable-width rectangular notch for gaging tools to cut square threads. There is an index scale for pitch on the shank for each of these two notches, but confusion is avoided by placing each index scale on the longitudinal edge of the shank nearest to the corresponding variable notch.

Preferably, this form of the invention has the further feature of employing two pointed fingers with parallel inner edges to define the rectangular gaging notch, the two pointed fingers having convergent outer sides, the angle of convergence being, for example, 29°. The inner parallel edges of the fingers gage tools for cutting square threads and the outer convergent edges of the fingers may be used to measure the separation or root dimension of both Acme screw threads and 29° worm gear threads.

The preferred form of the invention further provides a multiple purpose variable gage notch for use with tools to cut buttress threads. Buttress threads are relatively sharp and vary both in pitch and in the profile angle of convergence of the individual threads. In this instance, the auxiliary gage member that is movable relative to the main gage member is mounted thereon to vary the angle of convergence without shift in the apex of the angle. Here again remote index means avoids confusion at the notch proper. A feature of the invention, as will be explained, is the manner in which the auxiliary gage member is mounted in an arcuate slot in the main gage member for the required rotary movement about the apex of the slot to vary the angle of convergence of the slot without change in the location of the apex.

The above and other objects and advantages of the invention will be apparent in the following detailed description in conjunction with the accompanying drawing.

In the drawing, which is to be regarded as merely illustrative,

Figure 1 is a face or plan view of the presently preferred embodiment of the invention;

Figure 2 is an end elevation of the device;

Figure 3 is a section taken as indicated by the line 3—3 of Figure 1;

Figure 4 is a section on an enlarged scale taken as indicated by the line 4—4 of Figure 1;

Figure 5 is a fragmentary plan view of the device as used to gage a tool for cutting a square thread;

Figure 6 is a view similar to Figure 1 showing the second form of the invention; and Figure 7 is an end elevation of the second form of the invention.

Figure 1 shows, by way of example, the presently preferred embodiment of the invention. A main or first gage plate or member 10 is formed with a longitudinal channel or groove 11 that is cut into one face of the plate and opens on one end 12 of the plate. Slidingly mounted in the channel 11 is the shank portion 13 of a second gage plate or member, generally designated 14, that is formed with a head portion 15. The head portion 15 is positioned beyond the end edge 12 of the main plate 10 to define with said edge at least one gaging notch.

Any suitable provision may be made for retaining the shank portion 13 in the channel 11 and for releasably immobilizing the shank portion. For example, the shank portion 13 may have a longitudinal slot 16 to receive a screw 17 that is fixedly mounted in the bottom of the channel 11. A knurled nut 18 on the screw 17 may be manually tightened to immobilize the shank portion 13 at any desired position.

In the particular construction shown, the main gage plate 10 is cut or formed to provide a first edge 20 extending perpendicularly from one side of the channel 11, a second edge 21 inclined at 14½° from the first edge and forming therewith a first pointed gage finger 22, and a third edge 23 that lies on the opposite side of the channel 11 and inclines inward 14½° from a direction perpendicular to the channel 11. As may be seen in Figure 1, the third angled edge 23 is spaced away from the channel 11 being separated from the channel by the edge 12 that is perpendicular to the channel. Thus, the angled edge 23 and the end edge 12 form an apex 24.

The head portion 15 of the second gage member 14 has an inner edge 27 perpendicular to the shank portion 13, this inner edge 27 being paired with the previously mentioned first edge 20 to form a variable rectangular notch 28 for gaging tools to cut square threads. The head 15 further provides an outer angled edge 29 inclined 14½° from the edge 27 and forming with the edge 27 a second pointed gage finger 30. The head 15 is further formed to provide an inner edge 33 paired with the edge 23 of the main plate and an adjacent inner edge 34 paired with the edge 12, the edge 33 being inclined outward 14½° from the perpendicular and edge 34 being perpendicular to the axis of the shank portion 13. Thus, the two edges 33 and 34 of the head portion 15 meet to form a second index apex 24 paired with the first mentioned index apex 24. Preferably, index marks 35 are scribed on the main gage plate 10 and the head portion 15 of the second gage plate 14 at the two index apexes 24, respectively.

It is contemplated that the shank portion 13 of the second index member 14 and the adjacent area of the main gage member 10 will be suitably scribed to provide a pitch index for each of the variable notches that are defined by the movable head portion 15 in cooperation with the main gage plate 10. By way of example, Figure 1 shows an index marked 38 on the shank portion 13 and a cooperating scale 39 on the adjacent surface of the main gage member 10. This cooperating scale 39 is calibrated in terms of pitch for 29° Acme threads and is to be used for adjusting the head portion 15 for varying the notch formed by edges 23 and 33. To grind a tool 40, shown in dotted lines, to cut an Acme thread of a given pitch, the index mark 38 is registered with the desired pitch value on the scale 39 and then the tool is ground to conform to the two convergent edges 23 and 33 with the nose of the tool registered accurately with the two index apexes 24 and the two corresponding index marks 35.

To use the same variable notch to grind a tool for cutting 29° threads in a worm gear, a second index mark 43 on the same edge of the shank portion 13 is registered in the same manner with a desired pitch value on a pitch scale 44.

A third index mark 45 on the second longitudinal edge of the shank portion 13 is used in conjunction with a pitch scale 46 to adjust the spacing of the two parallel edges 20 and 27 for gaging a tool to cut a square thread. Finally, a fourth index mark 49 on the shank portion 13 may be used in conjunction with a suitable scale 50 to ascertain the pitch of any gear tooth or the root distance between two adjacent threads of a worm gear. Figure 1 shows, in dotted lines, a worm gear 51 with the two fingers 22 and 30 employed to measure the root distance between two threads of the gear, the measured distance being indicated by the fourth index mark 49 with reference to the scale 50.

The gage shown in Figure 1 also provides a variable V-shaped notch having convergent edges 55 and 56 to be used for gaging tools to cut buttress threads. It is contemplated that the angle of convergence between the edges 55 and 56 will be variable without change in the location of the apex of the notch in accord with the profile angles of a progressive series of buttress threads.

The range and angular variation should extend from 45° to at least 48° and preferably extends to 50°.

In the construction shown, the edge 55 is provided by cutting a V-shaped notch of greater than 50° convergence in the main gage plate 20 and by providing an auxiliary gage plate or member 58 that is mounted in a recess formed in the main gage plate for rotation about the apex of the notch, forming the edge 55. For this purpose, the auxiliary plate 58 is formed with an arcuate member 59 that is slidable in a corresponding arcuate slot 60 in the main plate 10, the curvature of the arcuate member and arcuate slot being concentric to the apex of the notch in the main plate. Thus, adjustment of the arcuate member 59 along the arcuate slot 60 rotates the auxiliary plate 58 to vary the angle of convergence of the two edges 55 and 56.

In the construction shown, a suitable screw 61, having a countersunk head 62, extends through both the arcuate member 59 and the auxiliary plate 58 and is provided with a knurled nut 63. Tightening of the knurled nut 63 immobilizes the auxiliary plate 58 relative to the main plate 10 at any desired angle of the edge 56 relative to the edge 55.

Any suitable index arrangement may be used to indicate the angle of the edge 56 relative to the edge 55. In the construction shown, the auxiliary plate 58 is connected by the screw 61 to a pointer 66 to be read with reference to a scale 67 that is calibrated in terms of angle variations. For guidance with respect to pitch, a scale or series of pitch index marks 68 may be provided at the margin of the variable notch, a tool being ground to cause its nose to register with the desired mark on the scale 68.

Preferably, the main gage plate 10 also has a 60° notch 75 for use in gaging tools to cut 60° screw threads. Various index marks 76 are provided with which the nose of tools register for various pitch values.

When the described device has been used to gage a tool it may be used subsequently for setting the tool accurately with respect to a workpiece. For this purpose, one longitudinal edge of the main gage plate 10 may be placed in longitudinal alignment against a workpiece in a lathe and a gage notch in the opposite longitudinal edge of the device may then be used to position the tool accurately, the tool being positioned accurately when it conforms with the notch as heretofore described.

The second form of the invention shown in Figures 6 and 7 comprises a single gage plate 80 with a series of notches, each notch having a plurality of nose index marks with which the nose of a tool is to register for cutting threads at the corresponding pitch. One notch is formed by two edges 81 and 82 converging at 29°. The edge 81 is provided with a pitch scale 85 to be used with reference to the noses of tools for cutting 29° threads on worm gears. In like manner, the edge 82 of the notch is provided with a pitch scale 86 for use in gaging tools for cutting 29° Acme threads.

For gaging tools to cut buttress threads, the gage plate 80 is provided with a series of notches which may comprise a 45° notch 87, a 46° notch 88, a 47° notch 89 and a 48° notch 90. Each of these four notches has a corresponding pitch scale 91 with which the noses of cutting tools are to be registered. The gage plate 80 may be further provided with a 60° notch 94 which is like the previously described notch 75 and is provided in like manner with a pitch scale 95.

The gage plate 80 may be provided further with various edges apart from the described notches for use in accurately positioning tools for thread cutting operations. In this use of the invention, one longitudinal edge of the gage plate is placed against a workpiece and the tool is then positioned accurately by means of an inclined edge of the gage plate. For this purpose, the gage plate 80 has an edge 98 at 45° from normal, an edge 99 at 5° from normal, an edge 100 at 14½° from normal and an edge 101 at 30° from normal, normal being taken as perpendicular to either of the longitudinal edges of the gage plate.

It will be apparent to those skilled in the art that various changes, modifications, substitutions and other departures may be made from the specifically described devices within the scope and spirit of the appended claims.

I claim as my invention:

1. A gage of the character described for thread-cutting tools comprising: a first gage member having a longitudinal channel opening on one of its ends, said gage member having a first edge on one side of said channel extending perpendicularly of said channel, a second edge forming with said first edge a first pointed finger tapered at 14½°, and a third angular edge on the other side of the channel extending inward at 14½° from the perpendicular; a second gage member having a shank portion mounted in said channel and a head portion outside the open end of the channel, one of said gage members having a longitudinal slot within the area of said channel, said head having an inner edge perpendicular to its shank and an outer edge forming with said inner edge a second pointed finger tapered at 14½°, said second finger being coextensive with said first finger to cooperate therewith to measure the root space between threads, said head portion having another inner edge inclined outward 14½° from perpendicular relative to said shank portion and paired with said third edge of the main gage member to form a tapered notch for gaging the opposite angular sides of a tapered thread cutting tool with the inner ends of said angular edges separated to gage the width of the nose of the tool, said auxiliary gage member being slidable in said channel to vary the separation of said fingers and said angled edges for threads of different pitch, said shank portion and the adjacent portion of the main member having two sets of indices for said pair of fingers and said pair of angled edges, respectively; and a third gage member forming with said first gage member a V-notch for gaging tools to cut buttress threads, at least one edge of said V-notch being indexed for the nose of the tools, said third gage member being movably mounted on said first gage member to swing about the apex of the V-notch as an axis to vary the angle of the V-notch to correspond to a series of buttress threads, said first and third gage members being provided with an index for said series.

2. A gage of the character described for thread cutting tools comprising: a first gage member having a longitudinal channel opening on one of its ends, said gage member having a first edge on one side of said channel extending perpendicularly of said channel, a second edge forming with said first edge a first pointed finger tapered at 14½°, and a third angular edge on the other side of the channel extending inward at 14½° from the perpendicular; a second gage member having a shank portion mounted in said channel and a head portion outside the open end of the channel, one of said gage members having a longitudinal slot within the area of said channel, said head having an inner edge perpendicular to its shank and an outer edge forming with said inner edge a second pointed finger tapered at 14½°, said second finger being coextensive with said first finger to cooperate therewith to measure the root space between threads, said head portion having another inner edge inclined outward 14½° from perpendicular relative to said shank portion and paired with said third edge of the main gage member to form a tapered notch for gaging the opposite angular sides of a tapered thread-cutting tool with the inner ends of said angular edges separated to gage with the width of the nose of the tool, said auxiliary gage member being slidable in said channel to vary the separation of said fingers and said angled edges for threads of different pitch, said shank portion and the adjacent portion of the main plate having two sets of indices for said pair of fingers and said pair of angled edges, respectively; a third gage member forming with said first gage member a V-notch for gaging tools to cut buttress threads, at least one edge of said V-notch being indexed for the nose of the tools, said first gage member having an arcuate slot concentric to the apex of said V-notch; and means mounting said third gage member on said first gage member, said mounting means being slidable in said slot and guided thereby for swinging movement of said third member about said apex as an axis to vary the angle of the V-notch to correspond to a series of buttress threads, said first and third gage members being provided with an index for said series.

References Cited in the file of this patent

UNITED STATES PATENTS

| Number | Name | Date |
|---|---|---|
| 465,397 | Taylor | Dec. 15, 1891 |
| 563,089 | Strange | June 30, 1896 |
| 715,377 | Hayes | Dec. 9, 1902 |
| 1,195,287 | Soisson | Aug. 22, 1916 |
| 1,597,636 | Sykes | Aug. 24, 1926 |
| 1,659,915 | Hilfiker | Feb. 21, 1928 |

FOREIGN PATENTS

| Number | Country | Date |
|---|---|---|
| 954,815 | France | June 20, 1949 |
| 163,386 | Austria | June 25, 1949 |